United States Patent [19]

Cailloux

[11] 4,188,659
[45] Feb. 12, 1980

[54] STATIC AC/AC THYRISTOR CONVERTER FOR A SELF-DRIVEN SYNCHRONOUS MOTOR

[75] Inventor: Michel Cailloux, Belfort, France

[73] Assignee: Ogee Alsthom, Levallois-Perret, France

[21] Appl. No.: 888,901

[22] Filed: Mar. 22, 1978

[30] Foreign Application Priority Data

Mar. 25, 1977 [FR] France ................. 77 08961

[51] Int. Cl.² .......................... H02M 5/45
[52] U.S. Cl. ...................... 363/37; 318/803
[58] Field of Search .......... 318/803, 810, 811; 363/34, 35, 37, 38

[56] References Cited

U.S. PATENT DOCUMENTS

| | | | |
|---|---|---|---|
| 3,136,937 | 6/1964 | Miljanic | 363/34 X |
| 3,781,641 | 12/1973 | Rettig | 363/36 |
| 3,939,387 | 2/1976 | Maeda | 363/34 X |

FOREIGN PATENT DOCUMENTS 1241904  6/1967  Fed. Rep. of Germany ............. 363/37

*Primary Examiner*—William M. Shoop
*Attorney, Agent, or Firm*—Sughrue, Rothwell, Mion, Zinn and Macpeak

[57] ABSTRACT

The invention comes within the field of static converters.

A static converter which comprises two Graetz rectifier bridges connected together at their DC terminals by first and second connections. One of the bridges is connected to the AC mains by means of a transformer and the other is connected to a variable speed synchronous machine. A third connection links the neutral conductor of the stator winding of the synchronous machine to the neutral conductor of the secondary winding of the transformer. Control means of the rectifier connected to the mains provide independent control for the upper half-bridge and the lower half-bridge of the rectifier.

4 Claims, 5 Drawing Figures

4,188,659

STATIC AC/AC THYRISTOR CONVERTER FOR A SELF-DRIVEN SYNCHRONOUS MOTOR

FIELD OF THE INVENTION

The invention relates to a static AC/AC thyristor converter which comprises a Graetz rectifier bridge referred to as a "machine" bridge for connection on its AC side to a variable speed synchronous machine having a star-wound stator, and connected on its DC side via first and second conductors to a static AC/DC converter referred to as the "mains" bridge which is for connection to a three-phase AC mains, said bridges including respective means for controlling the firing of their thyristors.

BACKGROUND OF THE INVENTION

It is known in such an assembly, there is an operation frequency of the synchronous machine below which the machine bridge can no longer operate without forced turn-off or extinction of the thyristors of the machine bridge. In general the installation is then made to function according to the mode sometimes called the "sequential" mode which is described hereinbelow. In the sequential mode, when it is necessary to change from one configuration of the machine bridge to another, the two thyristors which were conductive are extinguished by inverting the polarity of the mains bridge before the two thyristors which correspond to the new configuration of the machine bridge are turned on. Now, each time the machine bridge changes configuration, one of the two thyristors which was in the conductive state before the change is also in the conductive state after the change; its extinction is therefore useless and even detrimental, since during the period when both thyristors are off, no current flows in the machine and its torque is then zero.

SUMMARY OF THE INVENTION

The present invention aims to mitigate this disadvantage and provides a static AC/AC thyristor converter comprising a Graetz rectifier bridge, referred to as a "machine" bridge, for connection on its AC side to a variable-speed synchronous machine having a star-wound stator, and connected on its DC side via first and second conductors to a static AC/DC converter, referred to as a "mains" bridge, the mains bridge for connection to three-phase AC mains, said bridges including respective means for controlling the firing of their thyristors, the means for controlling the mains bridge converter being arranged to apply to said first and second conductors, voltages whose polarities may be identical to each other or opposite to each other, the AC/AC converter further including a third connection with a first end for connection to the centre of the star winding of the stator of the synchronous machine and with a second end for connection to a point such that the current, which flows in one or other of said first and second conductors when the polarities applied thereto in operation, are identical, returns to the three-phase AC mains via the third connection.

According to a first embodiment of the invention, the static AC/DC mains bridge converter is a single Graetz rectifier bridge and the transformer includes a star secondary winding to whose center the said second end of the third connection is connected.

According to a second embodiment of the invention, the static AC/DC mains bridge converter is constituted by two Graetz rectifier bridges connected together in series and the second end of the third connection is connected to the point which ensures the series connection of the two bridges.

Thus, due to this connection, the two Graetz rectifier bridges of the mains bridge or the upper half-bridge and the lower half-bridge of the mains bridge can be controlled independently and it is possible to turn off one of the conductive thyristors of the machine bridge by inverting the polarity of only one terminal of the mains bridge i.e. the terminal which is connected to the half-bridge of the machine bridge connected to the thyristor to be turned-off, while the thyristor situated in the other half-bridge circuit of the machine bridge continues to conduct, the current then returning towards the transformer by said third connection.

It follows that the current flowing through the machine is never zero, resulting in a considerable improvement in its torque curve.

Other advantages and characteristics of the present invention will become apparent from the description of embodiments of the invention given hereinbelow by way of example with reference to the drawings.

DESCRIPTION OF PREFERRED EMBODIMENTS

Figure 1:
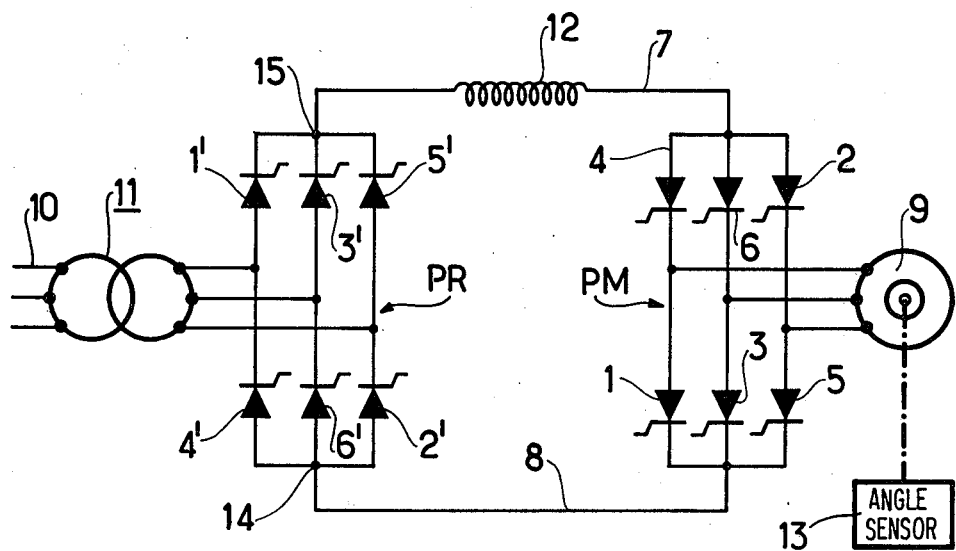
FIG. 1 shows an AC/AC static converter in accordance with the prior art.

With reference to FIG. 1, the converter comprises a first Graetz rectifier bridge referenced PM and which comprises six thyristors 1, 2, 3, 4, 5 and 6, and a second Graetz rectifier bridge referenced PR and which comprises six thyristors 1', 2', 3', 4', 5' and 6'. The two Graetz rectifier bridges are connected together by a first or upper conductor 7 and a second or lower conductor 8. The bridge PM is connected to a synchronous machine 9 and the bridge PR is connected to a three-phase AC mains 10 of fixed frequency by means of a transformer 11. An induction coil 12 is placed in the upper conductor 7. The two bridges include means for controlling the firing of the thyristors (not shown). It is known that with such an assembly in which the synchronous machine 9 operates at variable frequency and is operated at constant flux there is an operation frequency of the machine below which the bridge PM can no longer operate without using forced turn-off or extinction of the thyristors.

To obtain forced extinction of the corresponding thyristors, the installation is operated in the sequential mode. For example, when transferring conduction from the thyristors 1 and 2 to the thyristors 1 and 3, and angle sensor 13 placed at the end of the shaft of the machine 9 detects the need for this switching, the bridge PR is used in full inverter mode and inverts the polarity of its DC terminals 14 and 15, the terminal 15 becoming negative and no further firing pulses being applied to the thyristors of the bridge PM. The current Ic which flows in the upper and lower conductors 7 and 8 then decreases under the effect of the bridge PR. When this current Ic is zero, the thyristors 1 and 2 become isolated again. As soon as the current Ic is zero, firing pulses are applied to the thyristors 2 and 3 and the bridge PR is again used in rectifier mode, the terminal 15 then again becoming positive and the terminal 16 negative. The current Ic is then reestablished in the upper and lower conducts 7 and 8.

Figure 2:
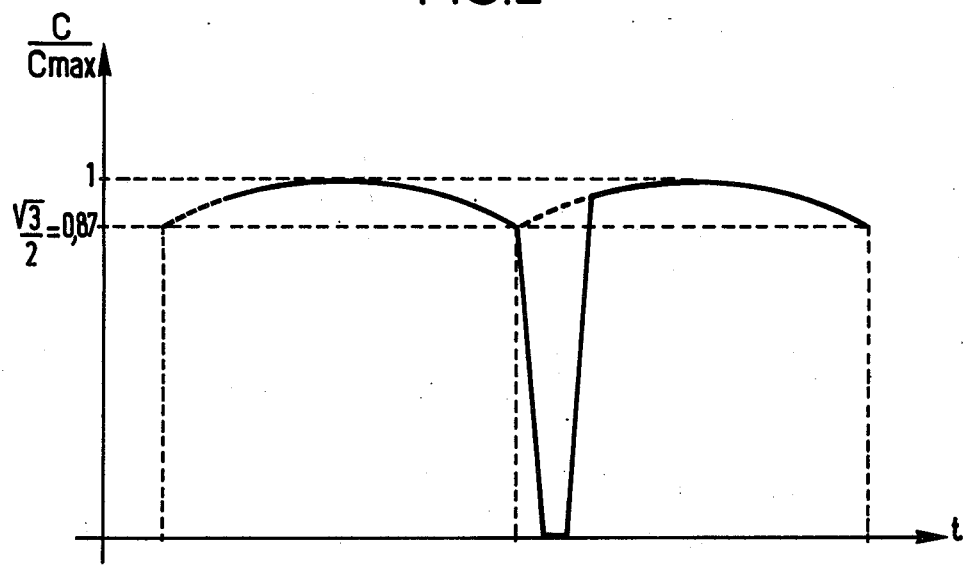
FIG. 2 is a graphic representation of the value of the electric moment of the synchronous machine of FIG. 1 at the time of switching the machine bridge according to the known sequential mode.

It is observed that during this switching, the two thyristors 1 and 2 which were conductive before switching are extinguished while one of them, in this case the thyristor 2, is fired again afterwards. It follows that the current Ic is zero during the whole time when no thyristor is conductive as is also, therefore, the torque of the machine 9 as is shown in FIG. 2.

Figure 3:
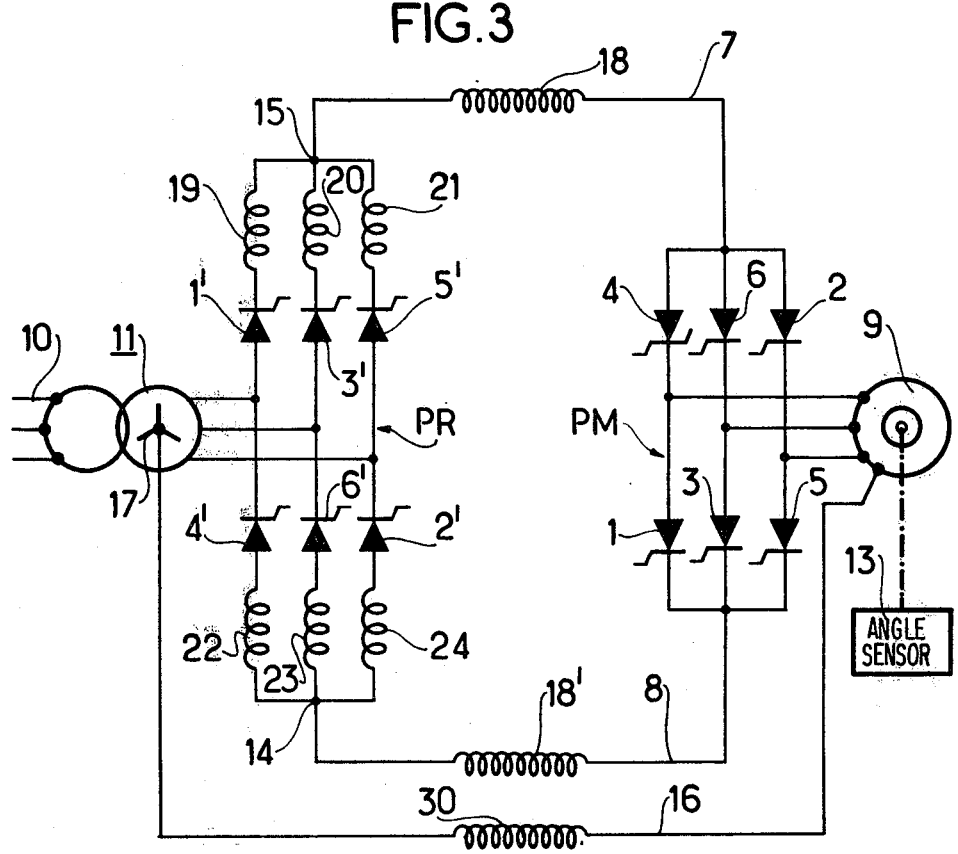
FIG. 3 shows a static AC/AC converter in accordance with the invention.

FIG. 3 shows a converter in accordance with the invention which includes essentially the same elements as those referenced in FIG. 1 but which also includes a third connection 16 which connects the center of the stator winding of the star-connected synchronous machine 9 to the center of the secondary winding 17 of the transformer 11 which is also star-connected. Due to this third connection, the upper half-bridge of PR constituted by the thyristors 1', 3' and 5' and the lower half-bridge constituted by the thyristors 4', 6' and 2' can be controlled independently of each other and it is possible to obtain opposite polarities or the same positive or negative polarity simultaneously on both the terminals 14 and 15, the current flowing in either of the conductors 7 and 8 then being able to return to the transformer 11 via the connection 16. The switching on of the thyristors 2 and 3 instead of the thyristors 1 and 2 is then effected as follows: when the angle sensor 13 detects the need for this switching, the lower half-bridge PR (4', 6', 2') is put into inverter mode, the terminal 14 therefore becoming positive and all firing pulses are turned off for the thyristors 1, 3 and 5 of the lower half-bridge PM. The current Ic then rapidly decreases in the lower conductor 8 and when it is zero, the thyristor 1 becomes isolated again. In contrast, the current which flows in the upper conductor 7 continues to flow and returns to the transformer 11 via the connection 16. As soon as the current has been reduced to zero in the lower conductor 8, a firing pulse is applied to the thyristor 3 and the lower half-bridge PR (4', 6', 2') is reset to rectifier mode, the terminal 14 becoming negative again. The current is then re-established in the lower conductor 8 and resumes a value equal to that which flows in the upper conductor 7, while the current in the connection 16 reduces to zero.

The process is identical at each switching except that the upper half-bridge PR (1', 3', 5') and the lower half-bridge PR (4', 6', 2') are put alternately into inverter mode at successive switching instants.

Figure 4:
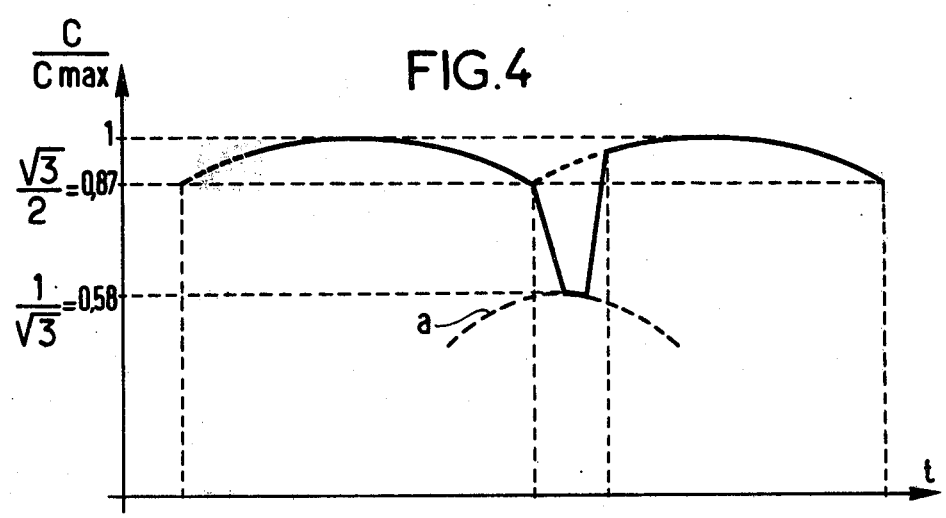
FIG. 4 is a graphic representation of the value of the electric torque of the synchronous machine in FIG. 3 at the time of a change over in the machine bridge.

The electric torque developed in the machine 9 is then shown by the curve in FIG. 4 which no longer drops to zero, since at the time of switching there is always one phase in operation: the curve in dotted lines (a) represents the electric torque developed in the machine with current in a single phase. The current which appears in the connection 8 is an alternating current with a frequency three times that of the synchronous machine, in the limit, i.e., at zero speed, this current becomes direct current. A few precautions indicated on FIG. 3 are necessary to ensure a proper operation of the assembly, particularly precautions of symmetry in relation to the neutral connection 16. Thus, the induction coil 12 in FIG. 1 must be divided into two equal induction coils, one of them 18 connected in the upper conductor 7 and the other 18' in the lower conductor 8. Likewise, rather than have one induction coil per phase, which are not shown in FIG. 1, an induction coil as at 19, 20, 21, 22, 23 and 24 is connected respectively in each arm of the bridge PR.

The transformer 11 which must be able to adapt itself to the presence of a current which is possibly direct current on its secondary neutral connection must use a forced flux magnetic circuit and preferably is provided with a triangular winding at the primary.

If these conditions cannot be satisfied by the transformer, an artificial neutral point winding provided with an auxiliary triangular winding can be used.

An induction coil 30 is connected in the connection 16 in particular if it is required to avoid having to interrupt this connection during the operation of the bridge PM in natural switching, i.e. without forced turn-off the connection 16 is useless during operation in natural switching; but maintaining it avoids having to interpose a cut-out device therein.

Figure 5:
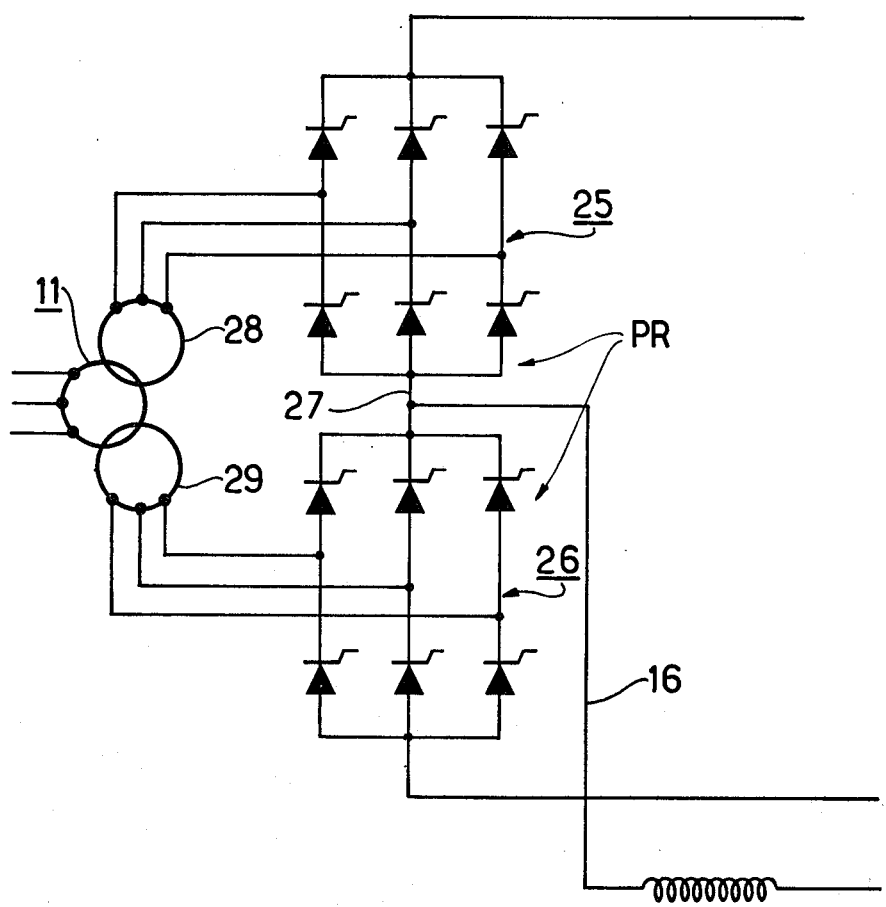
FIG. 5 shows a variant of the static converter in accordance with the invention.

FIG. 5 shows an example in which the mains bridge static converter PR which was constituted in the example of FIG. 3 by a single Graetz rectifier bridge is constituted by two Graetz rectifier bridges 25 and 26 connected together by a connection 27. The transformer 11 then includes two secondary windings 28 and 29 decoupled with respect to each other and connected respectively to the bridges 25 and 26. In this case, the third or neutral connection 16 is of course connected to the connection 27 linking the two bridges.

The independent control of the upper half and the lower half of the bridge PR or alternatively of the two series-connected Graetz rectifier bridges presents no difficulty. It is sufficient for each of these components to have a gate control circuit of its own; each of these bridges or half-bridges can then be driven by different control signals.

What is claimed is:

1. A static AC/AC thyristor converter comprising: a Graetz rectifier "machine" bridge for connection on its AC side to a variable-speed synchronous machine having a star-wound stator, and connected on its DC side via first and second conductors to a static AC/DC "mains" bridge converter for connection to three-phase AC mains, said bridges including respectively means for controlling the firing of their thyristors, said means for controlling the mains bridge converter including means for applying to said first and second conductors voltages whose polarities may be identical to each other or opposite to each other, said AC/AC converter further including a third connection having a first end connected to the center of the star winding of the stator of the synchronous machine and having a second end connected to an AC point of said mains bridge such that the current which flows in one or other of said first and second conductors when the polarities applied thereto in operation, are identical, returns to the three-phase AC mains via third connection.

2. A static AC/AC converter according to claim 1, wherein the static AC/DC mains bridge converter is a single Graetz rectifier bridge and is connected to the three-phase AC mains, via a transformer which includes a star secondary winding to whose centre the said second end of the third connection is connected.

3. A static AC/AC converter according to claim 1, wherein the static AC/DC mains bridge converter is constituted by two Graetz rectifier bridges connected together in series and wherein the second end of the third connection is connected to the point constituting the the series connection of the two bridges.

4. A static converter according to claim 1, wherein an induction coil is inserted in the third connection.

* * * * *